(12) United States Patent
Kirchner (10) Patent No.: US 8,949,870 B2
(45) Date of Patent: Feb. 3, 2015

(54) TRANSFER OF INFORMATION FROM AN INFORMATION NODE TO A BROADCAST PROGRAMMING RECEIVER

(75) Inventor: Anton H. Kirchner, Centennial, CO (US)

(73) Assignee: Dish Network L.L.C., Englewood, CO (US)

( * ) Notice: Subject to any disclaimer, the term of this patent is extended or adjusted under 35 U.S.C. 154(b) by 1076 days.

(21) Appl. No.: 12/328,651

(22) Filed: Dec. 4, 2008

(65) Prior Publication Data

US 2009/0165069 A1    Jun. 25, 2009

Related U.S. Application Data

(60) Provisional application No. 61/015,076, filed on Dec. 19, 2007.

(51) Int. Cl.
| | |
|---|---|
| H04H 60/33 | (2008.01) |
| H04N 7/16 | (2011.01) |
| H04N 21/41 | (2011.01) |
| H04N 21/4223 | (2011.01) |
| H04N 21/431 | (2011.01) |

(52) U.S. Cl.
CPC ........... *H04N 7/163* (2013.01); *H04N 21/4131* (2013.01); *H04N 21/4223* (2013.01); *H04N 21/4316* (2013.01)

USPC .................................. 725/9; 725/10; 725/12

(58) Field of Classification Search
CPC ... H04N 21/40; H04N 21/41; H04N 21/4131; H04N 21/43; H04N 21/4316
USPC .................................................. 725/9, 10, 12
See application file for complete search history.

(56) References Cited

U.S. PATENT DOCUMENTS

| | | | | | |
|---|---|---|---|---|---|
| 5,914,746 | A | * | 6/1999 | Matthews et al. | 725/132 |
| 6,031,579 | A | * | 2/2000 | Stephenson | 348/564 |
| 6,981,164 | B2 | * | 12/2005 | Bullman et al. | 713/324 |
| 2003/0070182 | A1 | * | 4/2003 | Pierre et al. | 725/135 |
| 2006/0218599 | A1 | * | 9/2006 | Tannenbaum | 725/86 |

* cited by examiner

*Primary Examiner* — Nicholas Corbo
(74) *Attorney, Agent, or Firm* — Kilpatrick Townsend & Stockton LLP (57) ABSTRACT

A method is provided for transferring information from an information node to a broadcast programming receiver, such as, for example, a satellite or cable set-top box receiving broadcast programming. The information node is coupled with the broadcast programming receiver by way of a communication network, and is configured to receive the information. A command issued from the broadcast programming receiver to the information node indicates a condition under which the information is to be transferred to the broadcast programming receiver. In response to the command, the portion of the information indicated by the condition is transferred to the broadcast programming receiver.

12 Claims, 5 Drawing Sheets

TRANSFER OF INFORMATION FROM AN INFORMATION NODE TO A BROADCAST PROGRAMMING RECEIVER

CROSS-REFERENCE TO RELATED APPLICATIONS

This application claims the benefit of U.S. Provisional Application No. 61/015,076, entitled "TRANSFER OF INFORMATION FROM AN INFORMATION NODE TO A BROADCAST PROGRAMMING RECEIVER" and filed Dec. 19, 2007, which is hereby incorporated herein by reference in its entirety.

BACKGROUND

The progress of electronics technology has increasingly improved the quality of life of the average person in a number of ways. For example, the delivery of radio and television programming by way of terrestrial, satellite, and cable signals to an audio/video receiver unit or set-top box located in the typical home now provides users access to an unprecedented amount of entertainment, news, weather, and sports programming. While much of the programming is provided primarily for the general interest and enjoyment of the viewer, the receiver unit or set-top box also provides a communication path over which news and weather information of imminent importance may be disseminated to a large number of users within a short period of time, thus enhancing the safety of the general public.

Additionally, more recently available electronics technology provides important information of a personal nature to the user. For example, home security equipment is often available with one or more video surveillance cameras that may allow a user to view important areas around the user's own home, such as the main entryway, thus allowing the user to identity a visitor effectively without approaching the front doorway. Even much simpler electronic devices, such as infant audio monitors, provide a user with important information regarding the welfare of a sleeping child. Further, personal weather stations that may be installed at a person's home to provide the user with timely local weather information. In each of these cases, the resulting information, while of a much more personal nature, is often no less important to the user than the broadcast programming described above.

BRIEF DESCRIPTION OF THE DRAWINGS

Many aspects of the present disclosure may be better understood with reference to the following drawings. The components in the drawings are not necessarily depicted to scale, as emphasis is instead placed upon clear illustration of the principles of the disclosure. Moreover, in the drawings, like reference numerals designate corresponding parts throughout the several views. Also, while several embodiments are described in connection with these drawings, the disclosure is not limited to the embodiments disclosed herein. On the contrary, the intent is to cover all alternatives, modifications, and equivalents.

DETAILED DESCRIPTION

The enclosed drawings and the following description depict specific embodiments of the invention to teach those skilled in the art how to make and use the best mode of the invention. For the purpose of teaching inventive principles, some conventional aspects have been simplified or omitted. Those skilled in the art will appreciate variations of these embodiments that fall within the scope of the invention. Those skilled in the art will also appreciate that the features described below can be combined in various ways to form multiple embodiments of the invention. As a result, the invention is not limited to the specific embodiments described below, but only by the claims and their equivalents.

Figure 1:
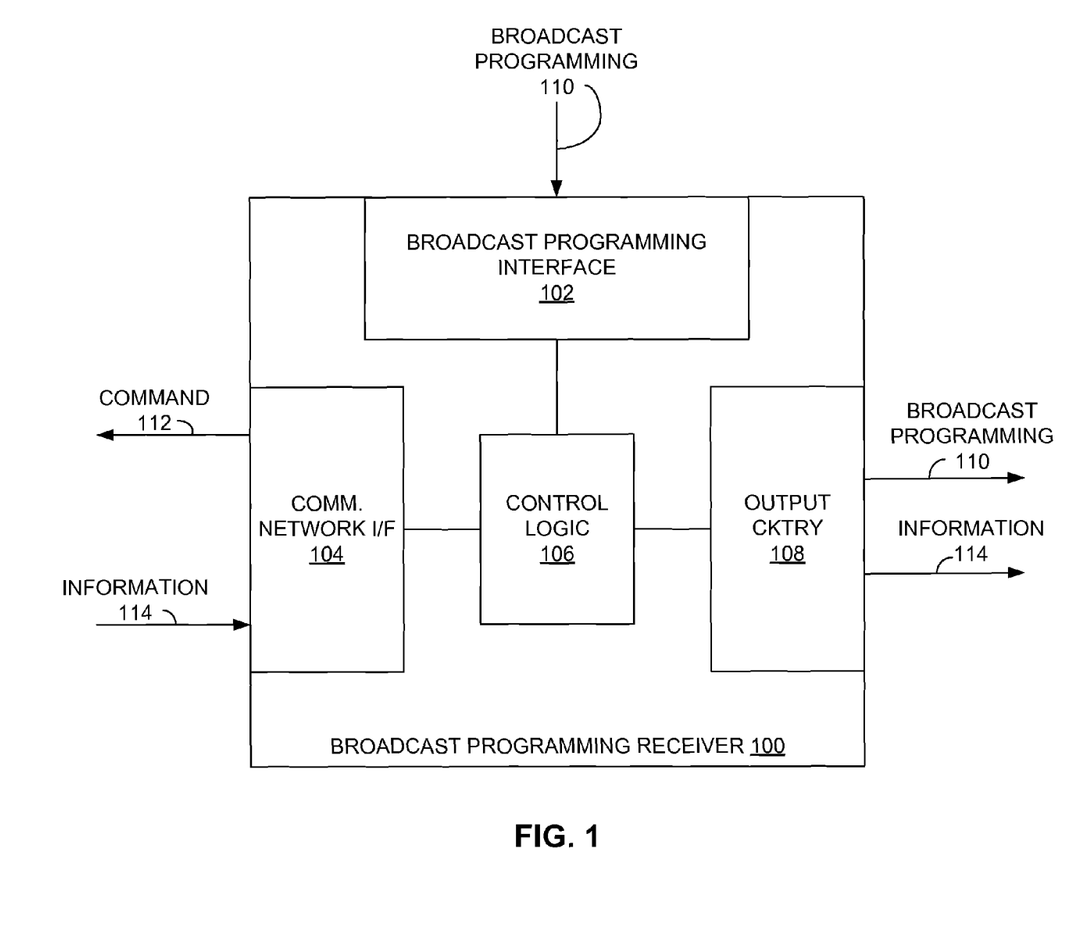
FIG. 1 is a block diagram of a broadcast programming receiver according to an embodiment of the invention.

FIG. 1 presents a block diagram of a broadcast programming receiver 100 according to an embodiment of the invention. The broadcast programming receiver 100 includes a broadcast programming interface 102, a communication network interface 104, control logic 106, and output circuitry 108. The broadcast programming interface 102 is configured to receive broadcast programming 110, such as audio and/or video programming. The communication network interface 104 is configured to transfer a command 112 to an information node (not shown in FIG. 1), and to receive information 114 from the information node. The information 114 may be, for example, any information of interest to a user that is not included in the broadcast programming 110. The control logic 106 is configured to generate and transfer the command 112 to the communication network interface 104, wherein the command 112 indicates a condition under which the information 114 is to be transferred from the information node to the communication network interface 104. The output circuitry 108 is configured to transfer the broadcast programming 110 and the information 114 to an output device (also not shown in FIG. 1).

While the control logic 206 is shown in FIG. 1 as being connected to each of the broadcast programming interface 102, the communication network interface 104, and the output circuitry 108, other connections between these various components may be employed while maintaining the capacity to perform the various functions described above.

An example of an information node 200 as mentioned earlier is shown by way of block diagram in FIG. 2. The information node 200 includes input circuitry 202, a communication network interface 204, and control logic 206. The input circuitry 202 is configured to receive information 214, such as information of interest to a user that is not provided within broadcast programming typically received by a broadcast programming receiver. The communication network interface 204 is configured to receive a command 212 from a client device, such as the broadcast programming receiver 100 of FIG. 1. The command 212 indicates a condition under which the information 214 is to be transferred to the client device. The control logic 206 is configured to process the command 212 and transfer the information 214 to the client device under the condition indicated in the command 212.

Figure 2:
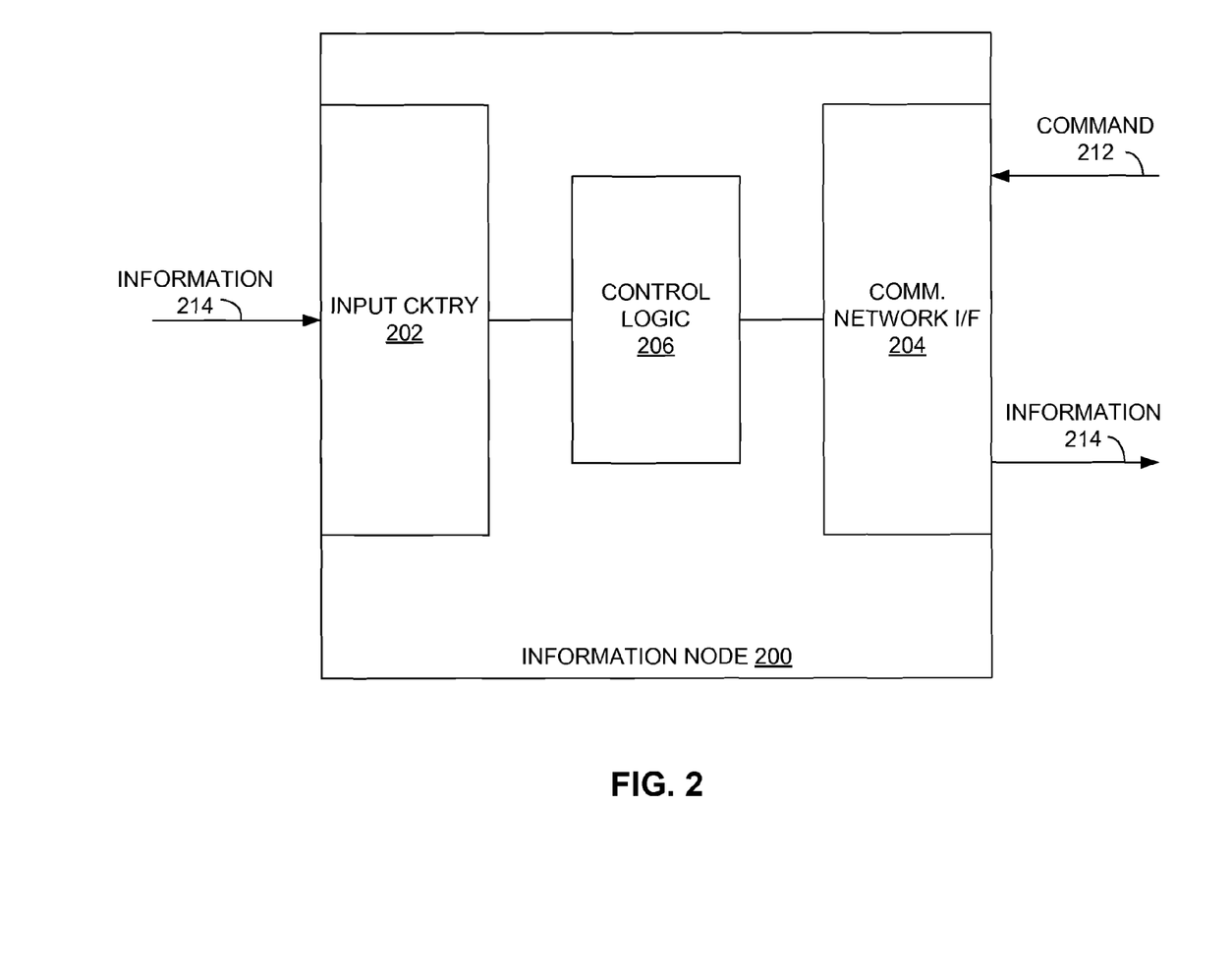
FIG. 2 is a block diagram of an information node for receiving information according to an embodiment of the invention.

While FIG. 2 depicts the control logic 206 being connected to both the input circuitry 202 and the communication network interface 204, other connections, such as a direct connection between the input circuitry 202 and the communication network interface 204, may also be possible while allowing the information node 200 to deliver the functionality discussed herein.

Figure 3:
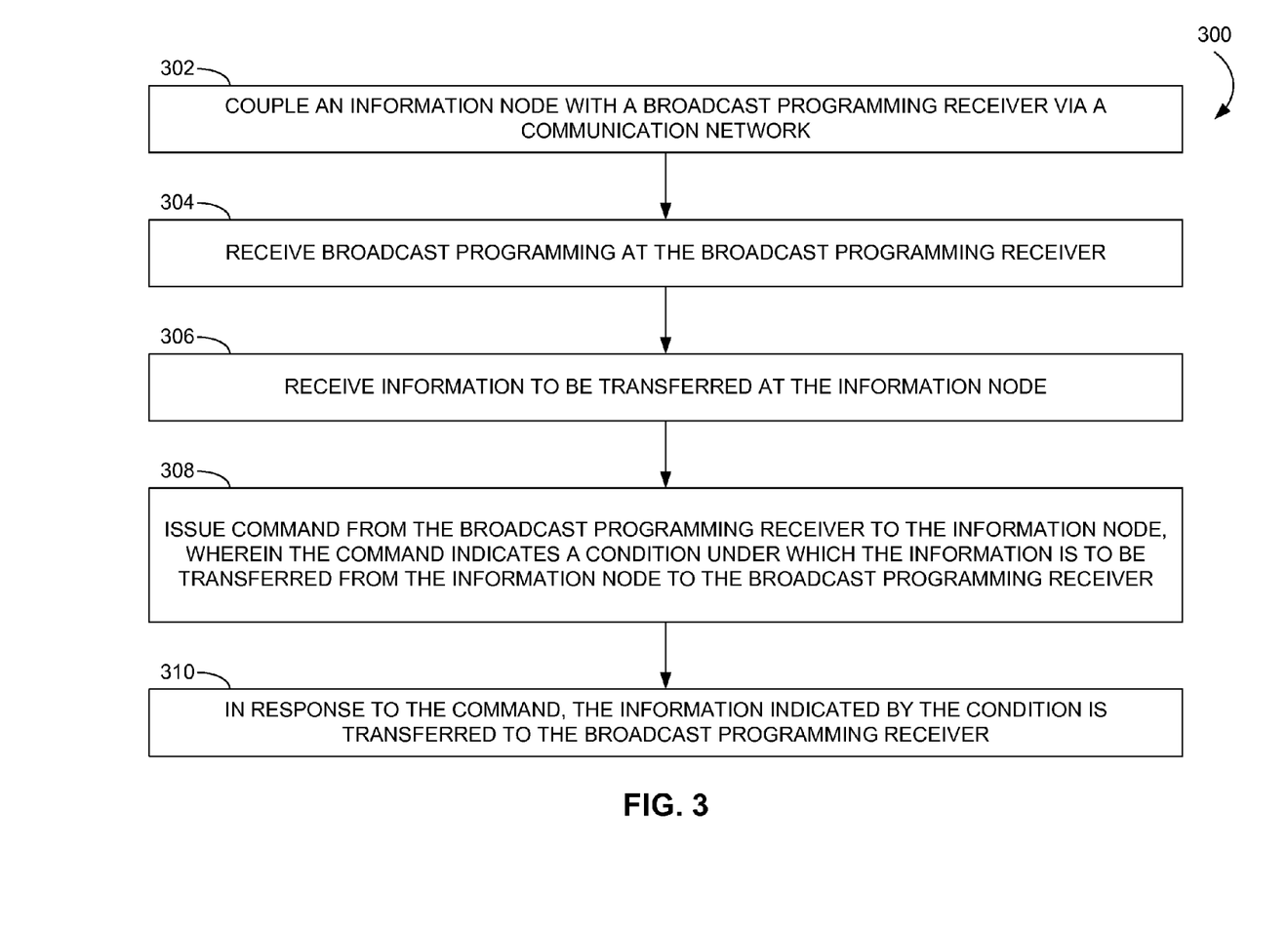
FIG. 3 is a flow diagram of a method according to an embodiment of the invention for transferring information from an information node to a broadcast programming receiver.

A method 300 for transferring information from an information node, such as the information node 200 of FIG. 2, to a broadcast programming receiver, such as the receiver 100 of FIG. 1, is depicted in FIG. 3. While the flow diagram of FIG. 3 and other figures presented herein depict a particular order for executing the various operations indicated therein, other orders of execution are also possible, including concurrent execution of one or more operations, while remaining within the scope of the invention.

In the method 300, the information node is coupled with the broadcast programming receiver via a communication network (operation 302). Broadcast programming is received at the broadcast programming receiver (operation 304), and the information to be transferred is received at the information node (operation 306). A command is issued from the broadcast programming receiver to the information node (operation 308). The command indicates a condition under which the information is to be transferred from the information node to the broadcast programming receiver. In response to the command, the information indicated by the condition is transferred to the broadcast programming receiver (operation 310).

Figure 4:
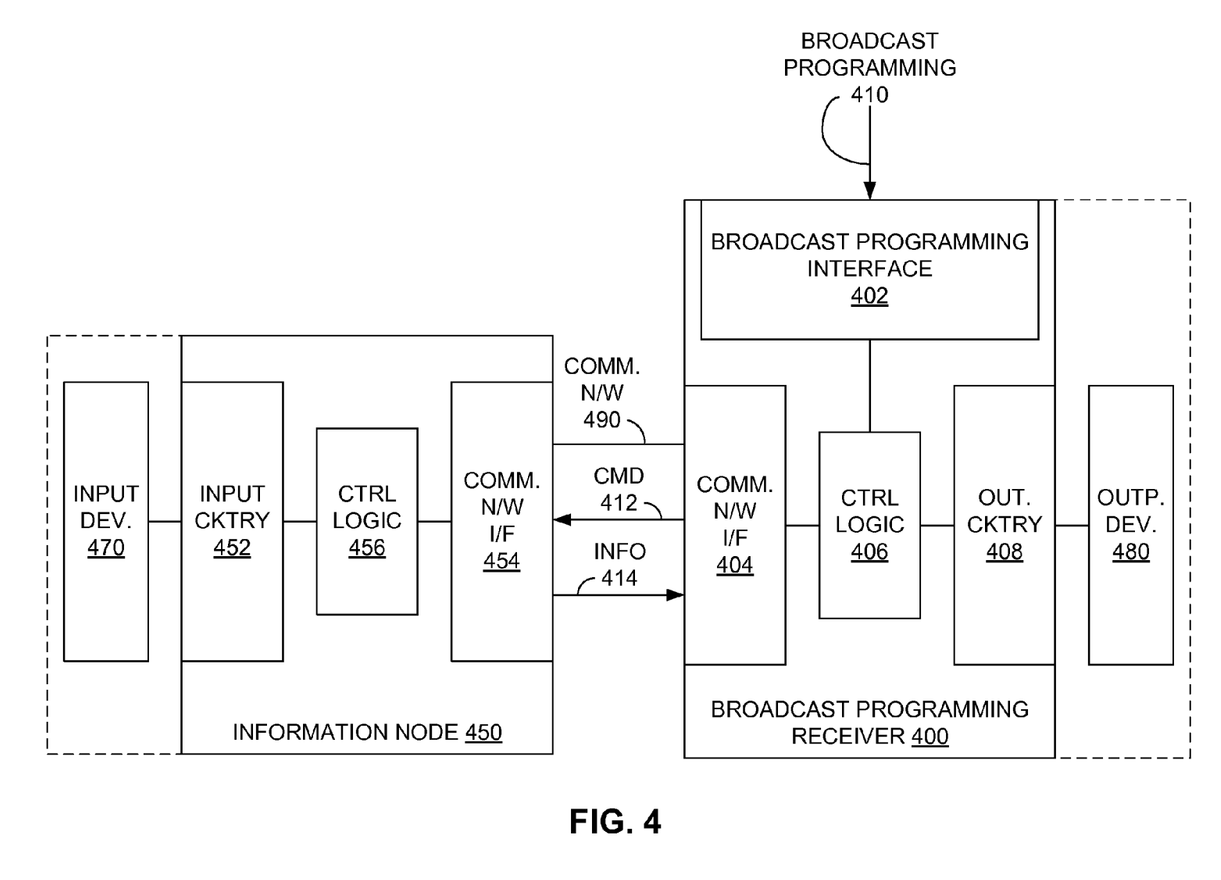
FIG. 4 is a block diagram of a system for receiving broadcast programming and other information according to an embodiment of the invention.

FIG. 4 provides an example system 401 including a broadcast programming receiver 400 and an information node 450 according to another embodiment of the invention. Information 414 received or captured by the information node 450 is transferred to the broadcast programming receiver 400 for ultimate receipt by a user, along with broadcast programming 410 received by the receiver 400. As described in greater detail below, the information 414 received by the information node 450 may include any type of information of interest to the user that is normally unavailable in the broadcast programming received by the receiver 400. Such information may include, but is not limited to, audio and/or video information, and weather information.

The broadcast programming receiver 400 may be any receiver configured to receive broadcast programming 410. Examples include, but are not limited to, a satellite television broadcast set-top box, such as a direct broadcast satellite (DBS) receiver, a cable television set-top box, and a satellite radio receiver. In the satellite television broadcast environment, the receiver 400 may be coupled with an output device 480, such as a television, video monitor, or audio amplifier, to allow a user to receive the broadcast programming in an audio or visual format. The connection between the receiver 400 and the output device 480 may be any kind of wired or wireless connection suitable for carrying the broadcast programming in a format understandable by the output device 480. Examples of such a connection include, but are not limited to, a composite video interface, a component video interface, a modulated radio frequency (RF) interface, and the High Definition Multimedia Interface (HDMI).

The broadcast programming receiver 400 includes a broadcast programming interface 402, a communication network interface 404, control logic 406, and output circuitry 408. The broadcast programming interface 402 includes circuitry which allows the receiver 400 to receive the broadcast programming 410 from an external source, such as from a television broadcast satellite by way of an antenna, or a cable television head-end via a coaxial cable. Such circuitry may perform a number of functions, such as frequency conversion of an incoming signal, tuning or selection of one or more programming channels from the incoming signal, and descrambling and/or decoding of one or more of the programming channels for presentation to the user.

The communication network interface 404 is configured to allow the broadcast programming receiver 400 to communicate with other devices, such as the information node 450, over a communication network 490. The communication network 490 may be any communication network capable of transmitting commands 412 and information 414 between the information node 450 and the broadcast programming receiver 400. In one embodiment, the communication network 490 may be a communication network implemented over the alternating current (AC) power lines of a home or other building, such as the network described in the HomePlug® 1.0 Specifications, published by the HomePlug® Powerline Alliance, and incorporated herein by reference in its entirety. Typically, a connection between the communication network interface and such a network is facilitated over the same power line cord employed by most electronic devices to receive AC power from a wall socket. Other types of communication networks, such as Ethernet, and other types of communication media, such as wireless, coaxial cable, 10/100 Base-T Category (CAT) 5 cable, and the like, may be utilized in other implementations.

The output circuitry 408 is configured to transfer both programming 410 received over the broadcast programming interface 402 and information 414 received over the communication network interface 404 to the output device 480. The output circuitry 408 may include circuitry for formatting, frequency conversion, and the like in order to convert the programming and the information into a format suitable for use by the output device 480.

The control logic 406 operates to control one or more various components of the broadcast programming receiver 400, such as any of the broadcast programming interface 402, the communication network interface 404, and the output circuitry 408. The control logic 406 may also provide the communication paths between each of the broadcast programming interface 402 and the communication network interface 404 to the output circuitry 408, as shown in FIG. 4. In other embodiments, such communication paths between these components may be provided separately from the control logic 406.

The control logic 406 may include a processing unit, such as a microprocessor, microcontroller, or digital signal processor (DSP) executing software or firmware to perform the various control functions discussed herein. In another embodiment, digital hardware control circuitry, or a combination of hardware and software or firmware elements, may be employed as the control logic 406.

The broadcast programming receiver 400 may also include other circuits or components not shown in FIG. 4, such as data storage for temporary or long-term storage of broadcast programming, multiple broadcast programming tuners, and a remote control interface for receiving user commands. Many such circuits may be controlled by way of the control logic 406.

In FIG. 4, the information 414 received over the communication network 490 via the communication network interface 404 of the broadcast programming receiver 400 is provided by the information node 450, which includes input circuitry 452, a communication network interface 454, and control logic 456.

The input circuitry 452 of the information node 450 may be any circuitry configured to receive the information, such as audio, video, or weather information, from an input device 470. The input device 470 may be any device configured to provide such information. For example, the input device 470 may be a still camera, a video camera, an audio microphone, a weather station, or some combination thereof. As a result, the input circuitry 452 may be configured to receive the information as analog signals, digital data, or any other form of data generated by the input device 470.

The communication network interface 454 is similar in configuration to the communication network interface 404 of the broadcast programming receiver 400, discussed above. In one particular example, the communication network interface 454 is an interface to a power line communication interface, such as HomePlug®, although other communication network interfaces may be employed in other applications, as described more fully above.

The control logic 456 provides control of one or both of the input circuitry 452 and the communication network interface 454. Specific implementations of the control logic 456 may include digital hardware, software, or some combination thereof, similar to the control logic 406 of the broadcast programming receiver 400. Also, the control logic 456 may provide the data pathways between the input circuitry 452 and the communication network interface 454, or those pathways may be implemented externally to the control logic 456.

Since the information 414 received from the input device 470 is transferred in one form or another from the input device 470 to the information node 450, the communication network 490, the broadcast programming receiver 400, and the output device 480, the information 414 may be represented in varying forms, such as analog signals and digital data of various formats and data rates, through the system 401. Thus, the particular form employed for the information 414 is dependent at least in part on the portion of the system 401 carrying the information 414.

As indicated by the dotted lines of FIG. 4, the output device 480 may actually be integrated within the broadcast programming receiver 400, while the input device 470 may be included within the information node 450. For example, the broadcast programming device may include a video monitor, audio speaker, or other means for relaying information to a user. Similarly, a camera or microphone serving as the input device 470 may be combined with the other components of the information node 450, thus providing a single integrated product for ease of deployment.

Depending on the specific embodiment, the system 401 may be implemented in a wide range of applications to provide information of particular interest or importance to a user while the user views or listens to broadcast programming by way of the receiver 400 and the output device 480. In one example, the input device 470 may be a video camera deployed outside the front door of the user's home so that the presence of a person outside the door may be detected by the user by way of the output device 480 while the user is viewing the broadcast programming 410. In another implementation, the input device 470 may be an audio microphone or similar monitoring device located in a child's bedroom, thus allowing the user to monitor the welfare of a child by way of the output device 480. In yet another scenario, the input device 470 may comprise a weather station capable of monitoring weather information, such as temperature, wind speed and direction, barometric pressure, and the like, with such information being made available to the user by way of a television or similar output device 480. Many other applications in which information not directly related to the programming received at the broadcast programming receiver may be addressed in other implementations of the system 401.

Figure 5:
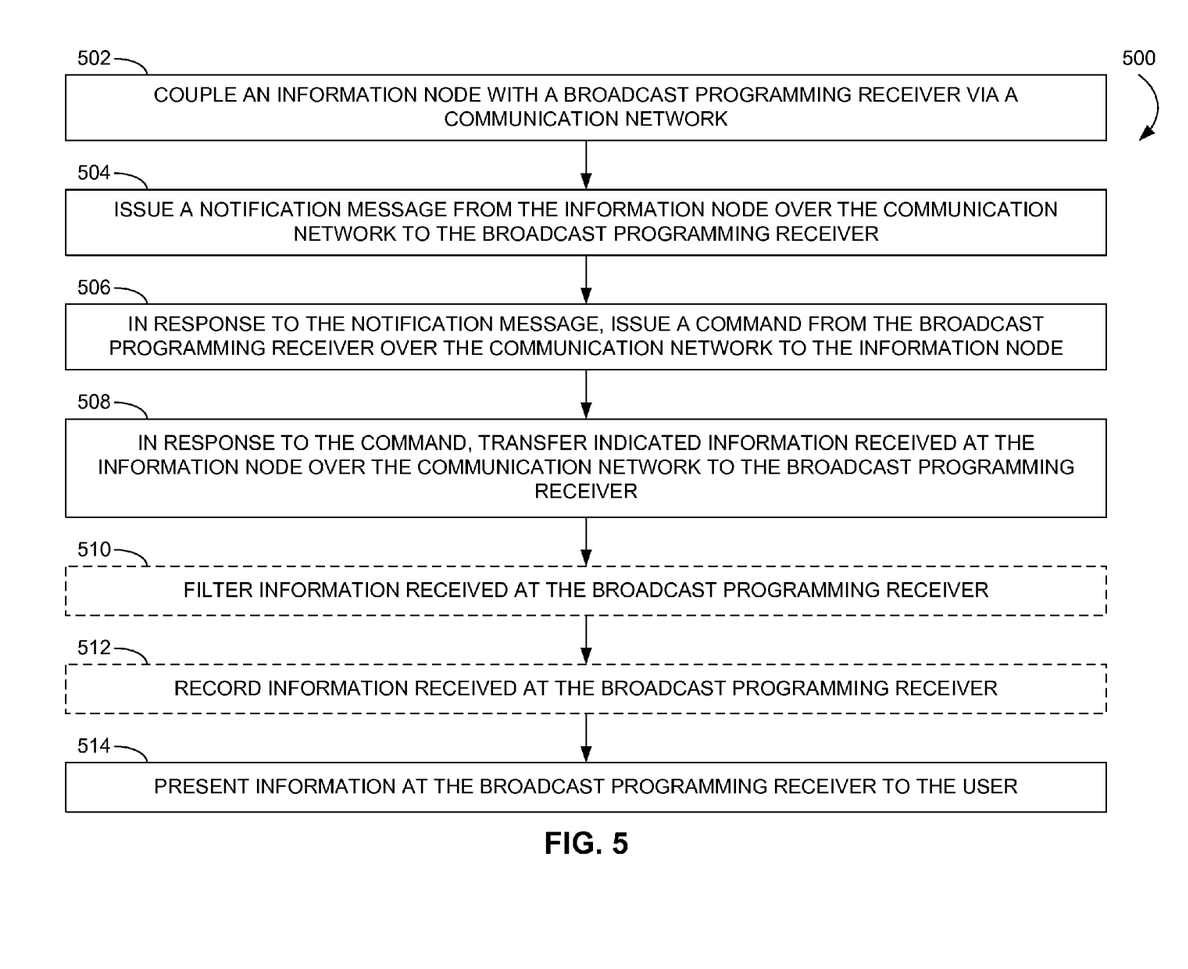
FIG. 5 is a flow diagram of a method according to an embodiment of the invention for transferring information from an information node to a broadcast programming receiver.

FIG. 5 displays a flow diagram of a method 500 for operating the system 401 in one embodiment. First, the broadcast programming receiver 400 and the information node 450 are coupled together by way of the communication network 490 (operation 502). For example, assuming the use of a HomePlug® network, each of the receiver 400 and the information node 450 may merely be plugged into respective wall sockets of the power distribution wiring of a house or other building. Connection by way of other wired or wireless networks is also contemplated herein, as described above.

The information node 450 may then issue a notification message over the network 490 to the broadcast programming receiver 400 (operation 504), thus notifying the receiver 400 of the presence of the information node 450 on the network 490. Until such a notification message is received, the receiver 400 may presume that the information node 450 will not respond to any commands 412.

In response to receiving the notification message, the receiver 400 may issue a command 412 via the network 490 to the information node 450 to provide an indication of at least one condition under which the information 414 is to be transferred from the information node 450 to the receiver 400 (operation 506). In one embodiment, the condition may be one or more parameters determining the timing, frequency, or amount of information to be transferred. For example, the command 412 may indicate that one frame of video be transferred from the input device 470, such as a video camera, through the information node 450 to the receiver 400 once per a specified time period, such as every five seconds. In another implementation, the command 412 may indicate that no video frames are to be transferred until motion is detected within the field of view of the video camera being utilized as the input device 470. Many other parameters may be represented in the command 412. Further, a user may set or alter and store these parameters within the broadcast programming receiver 400 by way of a remote control device or other user interface of the receiver 400 (not shown in FIG. 4) in conjunction with the control logic 406 residing therein. Regarding audio information, the command 412 may indicate that audio is to be transferred only if the audio reaches a predefined intensity level. Similar limitations may be placed on weather data and other information so that only information of interest to the user is transferred to the receiver 400. As a result, the flow of information 414 may be tailored to serve the needs of the user while operating within the data bandwidth constraints of the network 490.

In response to the command 412, the information node 450 may transfer the information 414 over the network 490 to the broadcast programming receiver 400 under the condition indicated in the command 412 when such information 414 is received (operation 508). The receiver 400, in turn, would then present the information 414, or some portion thereof, to the user by way of the output device 480, such as a television (operation 514). In one embodiment, the information 414 being received may completely replace any broadcast programming 410 being delivered to the output device 480 at the time, such as by supplanting any audio or video of the programming 410 with audio and video information from the information node 450. In another implementation, the information 414 may be provided in conjunction with the programming, such as by way of a picture-in-picture (PIP) window in the case of video information, a single picture or an array of multiple pictures in the case of single-frame information, or graphic overlay in the case of textual or graphical information, such as weather information. In one example, the user may determine how the information 414 is relayed as described above by way of the remote control device or other user interface.

In one embodiment, the broadcast programming receiver 400 may filter the information 414 being supplied by the information node 450 (operation 510) before presenting the information 414 to the user so that less than all of the information 414 being received is passed on to the output device 480. For example, many of the same conditions discussed above, such as motion detection, audio intensity thresholds, numerical limits, and the like, may be employed in the receiver 400 to qualify which of the information 414 received over the network 490 is relayed to the user. As before, such conditions may be set by the user by way of a remote control or other user interface of the receiver 400. One potential benefit of qualifying the information 414 in the receiver 400 is that the relative intelligence required in the information node 450 regarding the transfer of information 414 may be reduced, albeit at the possible cost of increased bandwidth requirements in transferring all information collected by the input device 470 over the network 490 to the receiver 400.

Presuming the broadcast programming receiver 400 includes a data storage device, such as that often used to implement a digital video recorder (DVR) feature, the information 414 received by the broadcast programming receiver 400 over the network 490 may be recorded for subsequent perusal by the user (operation 512). The information 414 recorded may be both information that has been relayed to the user, as well as information that has been filtered out by the broadcast programming receiver and, hence, not relayed to the user by way of the external output device 480. Such a function may be useful in circumstances in which the user is not available at the time the information 414 is received at the broadcast programming receiver 400. By storing the information, the user may later review video, audio, or other information that has been forwarded by the information node 450 to the receiver 400. Under another scenario, the user may be interested in obtaining more information regarding an event for which only a portion of the related information 414 was forwarded to the output device 480.

Various embodiments of the inventions, as described herein, may prove beneficial in a number of ways. Generally, worthwhile information regarding the environment of the user, such as audio or video data concerning the indoor or outdoor environment of a user's home, textual or graphical information regarding the weather, or any other information of interest to the user not associated with a broadcast programming receiver, may be relayed to the user while the user is enjoying a live or previously recorded broadcast program. Further, the user may select the particular information to be presented, as well as how the selected information is presented. As a result, the possibility that important information remains unnoticed while the user is preoccupied with a particular program may be reduced considerably.

While several embodiments of the invention have been discussed herein, other embodiments encompassed by the scope of the invention are possible. For example, while various embodiments have been described herein primarily within the context of audio, video, and weather information, other types of information not normally received as a part of broadcast programming may be relayed to the user in a similar manner. Such information may include financial data, sports statistics, and a wide variety of other information. Also, aspects of one embodiment may be combined with those of alternative embodiments to create further implementations of the present invention. Thus, while the present invention has been described in the context of specific embodiments, such descriptions are provided for illustration and not limitation. Accordingly, the proper scope of the present invention is delimited only by the following claims and their equivalents.

What is claimed is:

1. A broadcast programming receiver, comprising:
   a broadcast programming interface configured to receive broadcast programming;
   a communication network interface configured to transfer a command to an information node and to receive video frames from the information node, wherein:
     the information not being information available from broadcast programming,
     the command indicates a frequency, and
     the video frames are transferred periodically at a rate defined by the frequency;
   control logic configured to:
     receive a notification message from the information node indicative of a presence of the information node;
     in response to the notification message, generate and transfer, via the communication network interface, the command to the communication network interface, wherein the command indicates the frequency under which the video frames are to be transferred from the information node to the communication network interface; and
     filter, based on motion detection, the video frames received from the information node to identify qualified video frames;
   a data storage device configured to record the video frames received at the frequency transferred from the information node to the communication network interface; and
   output circuitry configured to transfer the broadcast programming and the qualified video frames to an output device.

2. The broadcast programming receiver of claim 1, wherein the output circuit outputs the qualified video frames in a picture-in-picture window within the broadcast programming.

3. The broadcast programming receiver of claim 1, wherein the output circuit outputs the qualified video frames to replace the broadcast programming.

4. The broadcast programming receiver of claim 1, wherein the broadcast programming receiver is integrated with the output device.

5. The broadcast programming receiver of claim 1, wherein the communication network interface comprises a power line network interface.

6. The broadcast programming receiver of claim 1, wherein the broadcast programming interface comprises a satellite audio/video receiver circuit.

7. The broadcast programming receiver of claim 1, wherein the broadcast programming interface comprises a cable audio/video receiver circuit.

8. An information node operatively coupled to a broadcast programming receiver, comprising:
   input circuitry configured to receive video frames from an input device;
   a communication network interface configured to receive a command from the broadcast programming receiver, wherein:
     the command indicates a frequency at which the video frames are to be transferred to the broadcast programming receiver,
     the video frames are transferred periodically at a rate defined by the frequency, and
     the video frames are not available from broadcast programming received by the broadcast programming receiver; and control logic configured to:
  cause a notification message to be transmitted to the broadcast programming receiver indicative of a presence of the information node; and
  following transmitting the notification message, process the command and transfer the video frames to the broadcast programming receiver at the frequency indicated in the command.

9. The information node of claim 8, wherein the information node is integrated with the input device.

10. The information node of claim 8, wherein the input device comprises at least one of a still camera and a video camera.

11. The information node of claim 8, wherein the communication network interface comprises a power line network interface.

12. A method for transferring information from an information node to a broadcast programming receiver, the method comprising:
  coupling the information node with the broadcast programming receiver via a communication network;
  transmitting a notification message from the information node indicative of a presence of the information node to the broadcast programming receiver;
  receiving broadcast programming at the broadcast programming receiver;
  receiving video frames at the information node;
  in response to the notification message received from the information node indicative of the presence of the information node, issuing a command from the broadcast programming receiver to the information node indicating a frequency of the video frames to be transferred from the information node to the broadcast programming receiver, the video frames not being available in the broadcast programming wherein the video frames are transferred periodically at a rate defined by the frequency;
  in response to the command, transferring the video frames at the frequency to the broadcast programming receiver;
  filtering, based on motion detection, by the broadcast programming receiver, the video frames received from the information node to determine qualified video frames;
  storing, by the broadcast programming receiver, the video frames received at the frequency transferred from the information node; and
  outputting broadcast programming and the qualified video frames to an output device.

* * * * *